United States Patent

[11] 3,554,516

[72] Inventors Jere Robert Denny
New York, N.Y.;
Deenahalli S. Krishnaswamy, Kelly Lake, Minn.
[21] Appl. No. 845,110
[22] Filed Feb. 4, 1969
Division of Ser. No. 516,953, Dec. 18, 1965, Patent No. 3,457,065.
[45] Patented Jan. 12, 1971
[73] Assignee Kennecott Copper Corporation

[54] APPARATUS FOR PRECIPITATING METAL FROM A SOLUTION
9 Claims, 5 Drawing Figs.
[52] U.S. Cl. ............................................. 266/22, 134/199, 210/189
[51] Int. Cl. ............................................. C22b 3/02
[50] Field of Search ............................................. 266/12, 22; 75/109; 134/199; 210/189

[56] References Cited
UNITED STATES PATENTS
| | | | |
|---|---|---|---|
| 1,163,829 | 12/1915 | Koering............... | 266/22 |
| 3,154,411 | 10/1964 | Back et al............ | 75/109 |
| 3,200,067 | 8/1965 | Levendusky......... | 210/80X |
| 3,333,953 | 8/1967 | Zimmerley et al.... | 23/211X |

Primary Examiner—J. Spencer Overholser
Assistant Examiner—John E. Roethel
Attorney—Frank E. Robbins

ABSTRACT: Apparatus for precipitating particles of a desired metal from a pregnant solution thereof, comprising: an upright vessel adapted to contain a precipitant metal for stripping the desired metal values from a pregnant solution in the form of a particulate precipitate, means for forcefully supplying pregnant solution to the interior of said vessel for reactive contact with the precipitant metal, and means for injecting a different fluid forcefully into said vessel at a plurality of spaced locations therein, for engagement against said precipitant metal, to enhance the contact between said solution and the precipitant metal.

PATENTED JAN 12 1971  3,554,516

INVENTORS
J. R. DENNY
D. S. KRISHNASWAMY
BY

ATTORNEY

INVENTORS
J. R. DENNY
D. S. KRISHNASWAMY
BY

ATTORNEY

APPARATUS FOR PRECIPITATING METAL FROM A SOLUTION

This application is a divisional application of copending application Ser. No. 516,953 filed Dec. 28, 1965 now U.S. Pat. No. 3,457,065, Jul. 22, 1969.

This invention relates to processes and apparatus for precipitating metals from aqueous solutions. More particularly, the invention relates to processes and apparatus for the recovery of cement or precipitate copper from pregnant leaching solutions containing copper values, by passing the pregnant leaching solutions into contact with iron, for replacement of the copper values in the solutions by iron values.

In recent years, increasing attention has been turned to the production of cement or precipitate copper, to augment the recovery of copper from mines by conventional mining techniques. Devices have been proposed for increasing the efficiency of the precipitation reaction.

For example, U.S. Pat. No. 3,154,411, issued Oct. 27, 1964, discloses one type of reaction device, that may aptly be described as a precipitation cone, where the precipitant is finely divided iron. This precipitant is maintained in dynamic suspension in the pregnant leaching solution, which is injected into the cone at its apex.

Another type of reaction device that could be employed would be a columnar device in which the precipitant metal is maintained as a loose mass within a generally upright column, and the pregnant leaching solution is passed upwardly through the mass of precipitant metal. Such devices are disclosed, for example, in U.S. Pat. No. 597,372, issued Jan. 11, 1898.

Still another type of device, that is being employed for carrying out precipitation reactions, makes use of a vessel that is nested within another vessel. The inner vessel is generally conical in shape, with its apex directed downwardly, and with its upper rim spaced form the interior surface of the outer vessel, to provide a gap. This gap is covered with a screen. The precipitant metal is placed within the inner vessel, and may be heaped up over the screen. A piping system is arranged to direct pregnant solution into the interior of the inner vessel, for flow upwardly through the precipitant metal. An overflow collection trough is disposed adjacent the upper rim of the outer vessel, to carry off stripped or barren liquid. The precipitate copper can pass through the screen to accumulate in the space between the two vessels, from which it can be drained off as desired. Precipitating devices of this type are described, for example, in the copending U.S. Pat. application of Zimmerley and Malouf, Ser. No. 319,302, now U.S. Pat. No. 3,333,953 commonly assigned, filed Oct. 28, 1963.

One object of the present invention is to provide a new, improved, practical method for improving the efficiency and effectiveness of metal precipitation reactions. A related object of the invention is to provide practical apparatus for carrying out the method of the invention.

Another object of the invention is to provide a relatively simple, inexpensive, and effective way for improving the performance of existing metal precipitation processes and devices.

A more specific object of the invention is to provide a relatively simple, inexpensive technique for improving the recovery of precipitate copper.

Other objects of the invention will be apparent hereinafter from the specification and from the recital of the appended claims.

Figure 1:
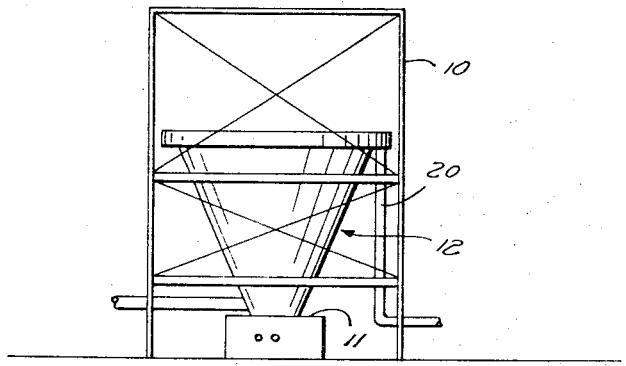
FIG. 1 is a fragmentary part side elevation, part axial section, of precipitation apparatus that is constructed in accordance with one preferred embodiment of this invention.
Figure 2:
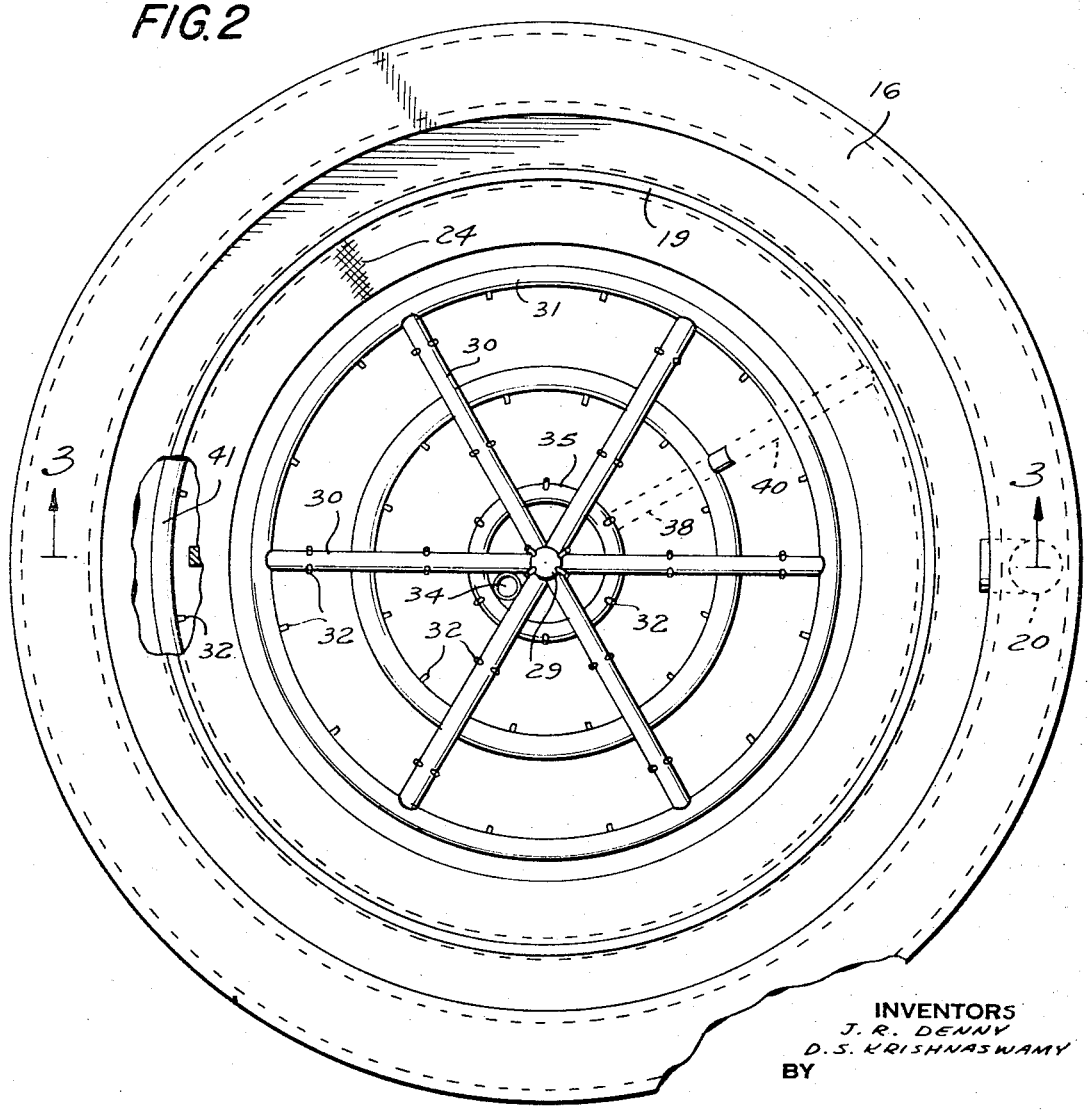
FIG. 2 is a top plan view thereof, partly broken away, on an enlarged scale.
Figure 3:
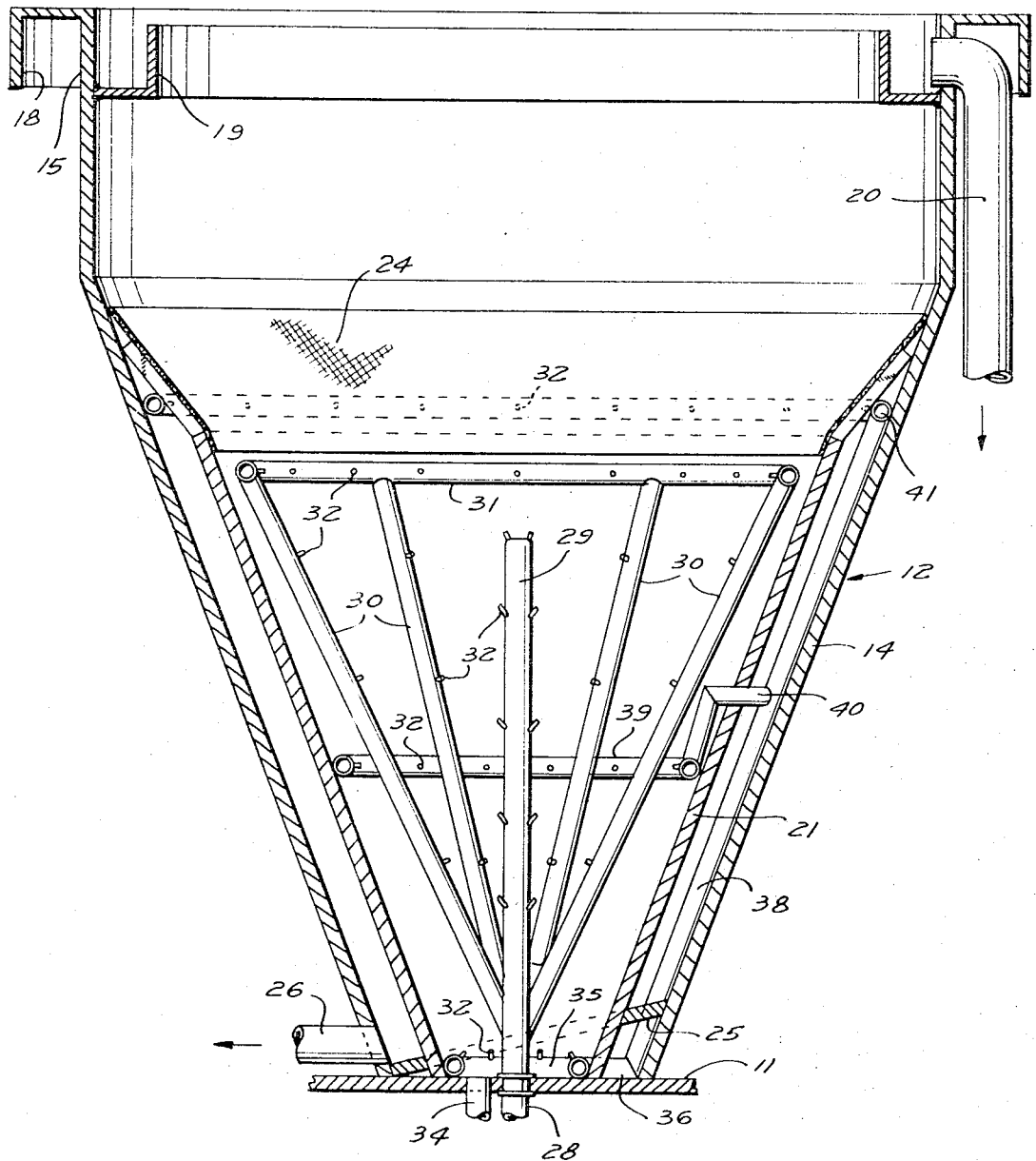
FIG. 3 is a fragmentary section, taken on the line 3-3 of FIG. 2, looking in the direction of the arrows.

Referring now in detail to the drawings by numerals of reference, the numeral 10 denotes a structural framework that is used to support a precipitation device that is constructed in accordance with one preferred embodiment of this invention. This structural framework supports the device but is not essential otherwise to its operation, and consequently is omitted from other views.

A pad 11 is disposed within the framework 10 to provide a base for the device. The device is formed with an outer vessel that is generally indicated by the numeral 12. This outer vessel has a wall 14 that engages against the base 11 at its lower end, and is formed with a horizontal section that increases upwardly, so that it has a generally conical or truncated conical shape. At its upper end, the outer vessel is formed with a generally cylindrical upward extension 15. This extension 15 is formed with an outwardly extending apron 16 and a downwardly depending skirt 18, for structural purposes. A trough 19 is mounted within the cylindrical extension, to provide an overflow to receive barren liquid. A discharge line 20 is disposed to communicate with the trough 19.

A second generally conical wall 21 is also mounted on the base 11, within the outer wall 14. This inner wall 21 also is generally in the shape of a truncated cone, and is generally in parallelism with the outer wall 14. The inner wall 21 is uniformly spaced form the outer wall, and is shorter than the outer wall, thereby providing a gap between the upper rim of the inner wall 21, and the confronting surface of the outer wall 14. In effect, this provides a vessel within a vessel.

A heavy gauge stainless steel mesh 24 is secured to extend between the upper rim of the inner wall 21 and a confronting but higher portion of the surface of the outer wall 14. While stainless steel is a preferred material for this mesh, any other relatively inert, strong mesh material may be employed.

In the space between the two vessels, at their lower ends, a sloping platform 25 is disposed, for a purpose to be described presently. This platform is sloped toward a discharge pipe 26, for permitting materials to be discharged from the space between the two vessels.

To supply pregnant leaching solution to the interior of the inner vessel, a manifold line 28 is extended upwardly through the base 11, to project into the interior of the inner vessel, generally axially thereof. Within the inner vessel, the manifold line communicates with a generally upright stub extension 29, that is closed at its upper end. It also communicates with a plurality of upwardly and outwardly extending lines 30. These lines 30 are interconnected at their upper ends respectively to a manifold ring 31, that is disposed just below the upper end of the inner wall 21. A plurality of short nipples 32 are disposed at spaced intervals along the lengths, respectively, of the upright stub extension 29, the lines 30, and the manifold ring 31. All of these nipples are disposed to direct pregnant leaching fluid toward the interior of the inner vessel, except those on the upright stub extension 29, which are directed generally radially outwardly and upwardly.

To supply secondary fluid to the device, a second manifold line 34 is connected through the base 11, and it communicates, in the interior of the inner vessel, with a ring 35 that is disposed on the surface of the base 11, at the lower end of the inner wall 21. This bottom ring 35 communicates through a horizontally extending line 36 with an upwardly directed line 38 that is engaged against and extends along the inner surface of the outer wall 14. An intermediate ring 39 is disposed within the inner vessel, in a central region between the lower and upper ends of the inner vessel. This intermediate ring 39 communicates through a line 40 with the generally upright of line 38. An upper ring 41 is disposed beneath the mesh 24, and also communicates with the upright line 38.

The bottom ring 35, the intermediate ring 39, and the upper ring 41, are each provided with a plurality of nipples 32 that permit discharge into the device. These nipples are directed either generally radially inwardly or are inclined somewhat upwardly.

Figure 4:
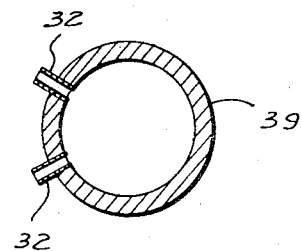
FIG. 4 is a transverse section through one of the secondary fluid supply lines, showing two of the injection jets, on an enlarged scale.
Figure 5:
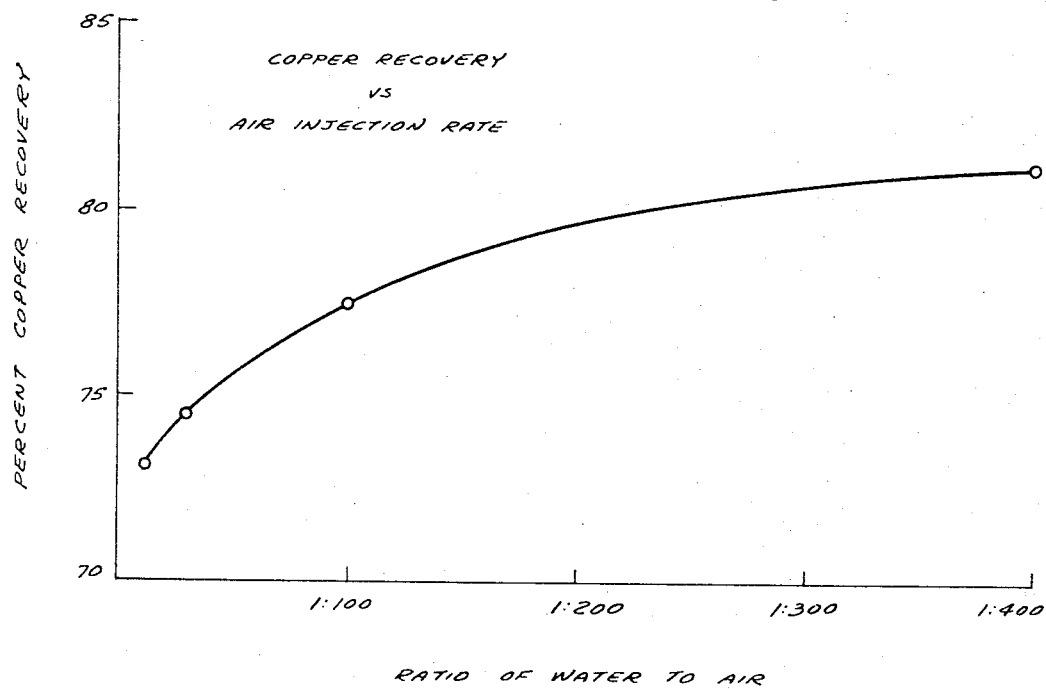
FIG. 5 is a graphic demonstration of the effect of secondary fluid injection upon copper recovery, in accordance with one embodiment of the present invention.

FIG. 4 is a transverse section on the intermediate ring 39, to show the manner in which the nipples may be arranged on that ring.

To place the device in operation, a load of scrap iron iron is dropped into the device, through its open upper end. Shredded tin can scrap, produced by burning tin cans to remove the tin coating, the label, any lacquer coating, solder from the seams, and any remainder of the original contents of the can, is a satisfactory kind of iron scrap for use in the device. The manifold line 28 is then connected to a source of pregnant leaching solution containing copper values. This pregnant solution is pumped through the manifold line 28 under sufficient pressure so that it fills the upright stub extension 29, the lines 30, and the manifold ring 31, and sprays out through their respective nipples 32 rather forcefully.

The pregnant leaching solution gradually rises within the vessels until it reaches the mesh 24. At this point, it overflows, until it fills the space between the inner wall 21 and the outer wall 14. It then continues to rise until it overflows into the trough 19, and is carried away through the discharge line 20. As the pregnant leaching solution rises, the copper values are replaced and precipitate copper is formed, as is conventional.

The injection of pregnant solution is maintained at a sufficient rate so that the particles of precipitate copper are carried up out the inner vessel and into the quiescent zone above the inner vessel. There, the precipitate copper settles, and falls through the mesh 24 into the space between the inner wall 21 and outer wall 14. A heavy sludge of precipitate copper in spent leaching solution accumulates on the inclined platform 25, and may be removed through the discharge line 26.

In accordance with the present invention, the manifold line 34 is now supplied with compressed air. The air flows into the device through the jets on the bottom ring 35, the intermediate ring 39, and the upper ring 41. The volume of air entering the device preferably is controlled by adjustment of a valve. The pressure at the supply may therefore have any value that is sufficient to deliver the desired volume of air into the device through the adjusting valve. Supply pressures of 60 p.s.i. and higher have been employed successfully.

The injection of air into the device creates substantial turbulence. The area of greatest turbulence is within the inner cone. However, since the air rises up through the device until it escapes at the surface of the leaching solution, there is agitation throughout the device. However, the air injection does not eliminate the relatively quiescent zone, so that precipitate copper continues to fall through the mesh screen 24 and accumulate between the inner and outer vessels.

The results that are obtained, as compared to the results obtained without the injection of a secondary fluid such as air, are quite surprising. The relative improvement obtained, for a given device, depends upon such parameters as type of precipitant metal employed, rate of pregnant solution input, concentration of the pregnant solution, operating temperature, and the like. However, the injection of a secondary fluid gives consistent improvement in the operation in many ways. For example, the rate of throughput can be increased substantially, with improvements of several hundred percent having been observed and not being unusual. The recovery of copper is increased several percent, with improvements on the order of about up to about 20 percent having been commonly observed.

In order to demonstrate the improvement that was obtained in the performance of a reaction device, through the use of the present invention, a precipitation cone was operated with and without air injection, with other operating variables being held substantially constant. First, the cone was operated in accordance with prior art practice, without air injection. The operating data of interest is summarized below in table I.

TABLE I

Cone performance—Without air injection

| Operating shift | Feed rate, g.p.m. | Pregnant solution, lbs./1,000 gals. | | | Barren solution, lbs./1,000 gals. | | | Recovery of Cu |
|---|---|---|---|---|---|---|---|---|
| | | Cu | Fe++ | Fe+++ | Cu | Fe++ | Fe+++ | |
| 1 | 1,914 | 3.8 | 4.5 | 0.8 | 1.5 | 7.5 | 0.5 | 60.5 |
| 2 | 1,914 | 3.9 | 3.9 | 1.0 | 1.5 | 7.5 | 0.4 | 61.5 |
| 3 | 1,914 | 3.8 | 4.6 | 0.8 | 1.6 | 7.3 | 0.5 | 57.9 |
| 4 | 1,993 | 3.9 | 4.8 | 0.8 | 2.1 | 7.0 | 0.5 | 46.2 |
| Average | 1,954 | 3.85 | | | 1.68 | | | 56.4 |

With normal operating variables held substantially constant, the cone was then operated with air injection. The observed results are summarized in table II.

TABLE II

Cone performance—With air injection

| Operating shift | Feed rate, g.p.m. | Pregnant solution, lbs./1,000 gals. | | | Barren solution, lbs./1,000 gals. | | | Recovery of Cu |
|---|---|---|---|---|---|---|---|---|
| | | Cu | Fe++ | Fe+++ | Cu | Fe++ | Fe+++ | |
| 5 | 1,869 | 3.8 | 4.6 | 0.7 | 0.8 | 9.4 | 0.2 | 78.9 |
| 6 | 1,869 | 4.0 | 4.8 | 0.8 | 1.0 | 9.2 | 0.1 | 75.0 |
| 7 | 1,970 | 3.8 | 4.7 | 0.6 | 0.9 | 9.2 | 0.0 | 76.3 |
| 8 | 1,948 | 3.8 | 4.5 | 1.0 | 0.9 | 9.0 | 0.1 | 76.3 |
| Average | 1,914 | 3.85 | | | 0.9 | | | 76.6 |

In both tables, the percentage recovery of copper is calculated for average copper content of both pregnant solution and barren solution.

During operating shifts 5 and 6, air was injected into the cone, which had substantially the configuration illustrated in the drawings, only through the bottom ring and the intermediate ring. During shifts 7 and 8, the volume of air was adjusted to be substantially less than the volume used during shifts 5 and 6.

As the results in these tables demonstrate, the recovery of copper is substantially improved by the injection of air.

The effect of employing different amounts of injected air was observed during another series of demonstrations of the invention. The observed data is summarized in table III below.

TABLE III

Effect of changing the air volume injected

| Operating test | Ratio of water to air, by volume | Pregnant solution lbs. Cu/1,000 gals. | Barren solution | Percent Cu recovery |
|---|---|---|---|---|
| 9 | 1:12 | 6.80 | 1.82 | 73.2 |
| 10 | 1:28 | 6.80 | 1.74 | 74.4 |
| 11 | 1:100 | 6.80 | 1.52 | 77.6 |
| 12 | 1:400 | 6.80 | 1.26 | 81.5 |

The ratio of water to air, by volume, is in terms of ambient conditions of temperature and pressure.

As the data in table III demonstrates, at the particular feed rate employed, increasing copper recoveries were obtained as the amount of injected air was increased. The optimum amount of air to be employed, in any particular piece of equipment, with any particular kind of pregnant leaching solution, would have to be determined by experimentation.

Improvements in performance have been obtained not only by using air, but also by using other injected fluids. For example, nitrogen and oxygen have been successfully employed. In some cases, the use of barren leaching solution as a secondary fluid gives successful results in the form of improved performance.

While the reason for the improved performance is not clear, it appears that the injection of a secondary fluid enhances the contact between the pregnant solution and the precipitant metal. Possibly the injection of a secondary fluid effects a scouring action on the precipitant metal, to remove the precipitate copper that might otherwise blow down the reaction rate. Also, it is possible that the injection of the secondary fluid increases turbulence within the device and thus accelerates the rate of contact between the precipitant metal and the pregnant leaching solution. Whatever the reason, as the data presented demonstrates, improved operating performance is obtained.

While the invention has been disclosed herein by reference to the details of a preferred embodiment thereof, it is to be understood that such disclosure is intended in an illustrative, rather than a limiting sense, and it is contemplated that various modifications in the technique of the invention will readily occur to those skilled in the art, within the spirit of the invention and the scope of the appended claims. For example, while the invention has been described herein with specific references to the application of the invention to a precipitating cone in which shredded tin cans have been employed as the precipitant metal, it is equally applicable to precipitating devices such as cones, columns, and the like, where other precipitant metals are employed, such as, for example, a precipitating cone employing powdered sponge iron as the precipitant.

We claim:
1. Apparatus for precipitating particles of a desired metal from a pregnant solution thereof, comprising:
   an upright vessel adapted to contain a precipitant metal for stripping the desired metal values from a pregnant solution in the form of a particulate precipitate;
   means for forcefully supplying pregnant solution to the interior of said vessel for reactive contact with the precipitant metal; and
   means for injecting a different fluid forcefully into said vessel at a plurality of spaced locations therein, for engagement against said precipitant metal, to enhance the contact between said solution and the precipitant metal.

2. Apparatus in accordance with claim 1 wherein said injection means comprises means for injecting a gas at a plurality of separate locations within said vessel.

3. Apparatus in accordance with claim 2 wherein said vessel is formed with a horizontal cross section that increases upwardly.

4. Apparatus in accordance with claim 3 wherein said vessel is generally conical in shape.

5. Apparatus in accordance with claim 4 wherein said means for injecting the gas into the vessel comprises a plurality of supply pipes that are disposed within said vessel and that are equipped with spaced jets to direct the gas toward the interior of the vessel.

6. Apparatus in accordance with claim 1 including:
   a second, outer vessel that is disposed about said first vessel and that has an upper section that extends above, and a lower section that extends below, the upper rim of said inner vessel;
   said outer vessel having a large diameter relative to said first vessel, thereby providing a confined, relatively quiescent zone above said inner vessel, and also providing a gap intermediate the upper rim of said inner vessel and the internal surface of said outer vessel;
   said outer vessel being provided within its upper section with an overflow collection means for stripped solution; and
   foraminous means disposed across said gap to restrain entry of the precipitant metal into the gap while permitting entry of the particulate precipitate therein.

7. Apparatus in accordance with claim 6 wherein said injection means comprises means for injecting a gas at a plurality of spaced locations within said inner vessel.

8. Apparatus in accordance with claim 7 wherein said inner vessel is generally conical in shape, and is disposed so that its horizontal section increases upwardly, and wherein said gas injection means comprises a plurality of supply pipes that are disposed within said inner vessel and that are equipped with spaced jets to direct the gas toward the interior of the vessel.

9. Apparatus in accordance with claim 7 including means disposed beneath said foraminous means for injecting gas to flow through said foraminous means into said relatively quiescent zone.